No. 717,922. PATENTED JAN. 6, 1903.
W. H. RAMSCAR.
BRAKE FOR BABY CARRIAGES.
APPLICATION FILED MAY 22, 1902.
NO MODEL.
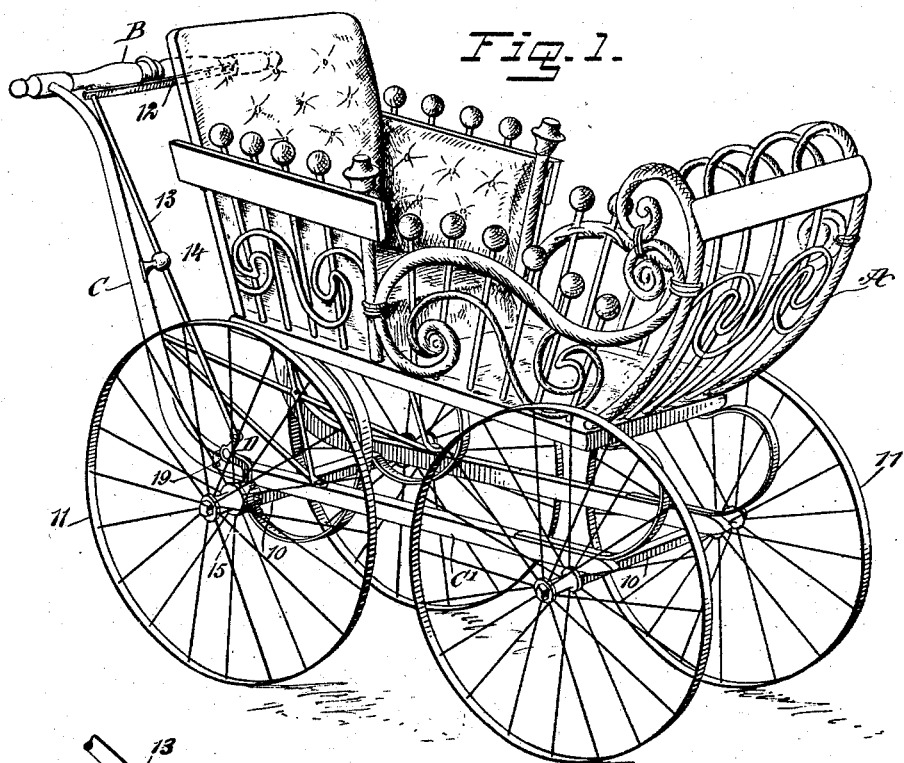
WITNESSES:
James F. Duhamel
[signature]
INVENTOR
William H. Ramscar
BY
[signature]
ATTORNEYS.

UNITED STATES PATENT OFFICE.

WILLIAM H. RAMSCAR, OF CORNWALL-ON-THE-HUDSON, NEW YORK.

BRAKE FOR BABY-CARRIAGES.

SPECIFICATION forming part of Letters Patent No. 717,922, dated January 6, 1903.

Application filed May 22, 1902. Serial No. 108,498. (No model.)

*To all whom it may concern:*

Be it known that I, WILLIAM H. RAMSCAR, a citizen of the United States, and a resident of Cornwall-on-the-Hudson, in the county of Orange and State of New York, have invented a new and Improved Brake for Baby-Carriages, of which the following is a full, clear, and exact description.

The purpose of the invention is to provide a simple form of brake which is automatically applied and manually released when the handle-bar is grasped, and, further, to provide a construction of brake which may be applied to any baby-carriage without weakening its construction or detracting from its appearance.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1 is a perspective view of a baby-carriage and the improved brake applied thereto. Fig. 2 is a sectional side elevation of the brake mechanism, and Fig. 3 is a front elevation of the parts shown in Fig. 2.

A represents the body of the baby-carriage, B the handle-bar, and C the supports for the handle-bar, which supports at their lower ends are carried horizontally forward to form reaches C' or connecting members for the axles 10, to which they are secured, said axles being provided with the usual wheels 11. A strap-spring 12 is secured at its left-hand end to the forward end portion of the handle-bar B and extends unattached in direction of the right-hand end of the handle-bar out, of engagement therewith, and at the free end of the spring 12 the upper end of a connecting-rod 13 is secured, which connecting-rod extends downward and forward through a guide 14 on the right-hand handle-support C to a connection with a brake mechanism D, to be herinafter described.

A brake-band 15 is secured to or is made integral with the inner face of the hub of the right-hand rear wheel 11, and from the inner edge of said band horizontal fingers 16 are inwardly projected. In the spaces 17 between said fingers the brake mechanism is adapted to act. The opposing side surfaces of the fingers 16 may be straight or inclined, according to the character of the brake mechanism employed. Preferably, however, the fingers 16 are made more or less tapering in cross-section, as is shown in Fig. 2.

A plate 18 is secured to the right-hand reach C' by means of rivets or like devices, and upon this plate, through the medium of a pivot-pin 20, an elbow-lever 19 is fulcrumed, provided with a downwardly-extending member 21 and an upwardly-extending stud $21^a$. The stud $21^a$ is pivotally attached to the connecting bar or rod 13 and is located just above the pivot-pin 20, and said lever is so placed upon the right-hand reach C' that the action of the spring 12 upon the connecting-rod 13 will cause the downwardly-projecting forward member 21 of the lever to normally enter a space 17 between the fingers 16 of the hub-band 15, thus preventing the right-hand rear wheel from turning and causing the carriage to remain stationary.

The brake can be instantly relieved from engagement with the right-hand rear wheel of the carriage by drawing the free end of the spring 12 rearward, which action is automatically brought about by grasping the right-hand portion of the handle, and the moment the grip upon this portion of the handle is loosened the spring 12 will instantly act to apply the brake. It is evident that the brake may be placed at either side of the carriage and operated from either end of the handle-bar.

I desire it to be understood that the brake may be applied to grocers' push-carts and like vehicles with equally good results as to baby-carriages.

Having thus described my invention, I claim as new and desire to secure by Letters Patent—

In baby-carriages or like push-vehicles, the combination with the handle-bar, a wheel of the carriage, a brake mechanism, and a rod connected at one end with the brake mechanism, of a strap-spring secured at one end to the forward face of the handle-bar at one end thereof, the other or free end of said spring being normally out of engagement with the handle-bar and connected with the other end of said rod, as set forth.

In testimony whereof I have signed my name to this specification in the presence of two subscribing witnesses.

WILLIAM H. RAMSCAR.

Witnesses:
STEPHEN B. YOUNG,
WILLIAM A. SEAMAN.